Sept. 25, 1956  R. R. RICHOLT  2,764,181
VALVE PACKING INSTALLATION
Filed Nov. 15, 1952
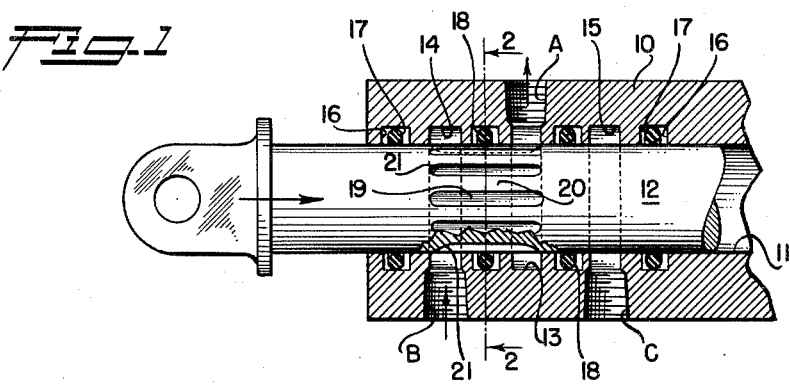
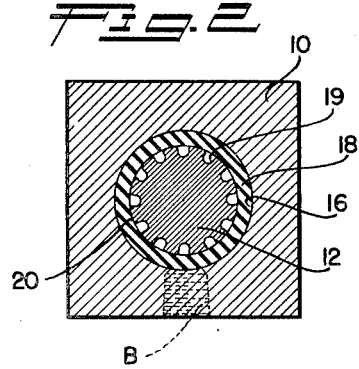
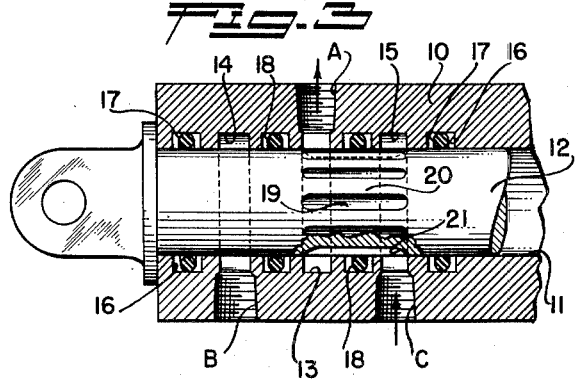
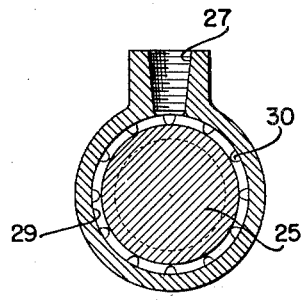
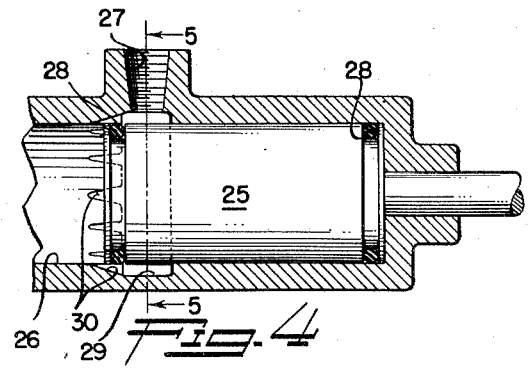
INVENTOR.
ROBERT R. RICHOLT
BY
George C. Sullivan
Agent United States Patent Office 2,764,181
Patented Sept. 25, 1956

2,764,181

VALVE PACKING INSTALLATION

Robert R. Richolt, Los Angeles, Calif., assignor to Lockheed Aircraft Corporation, Burbank, Calif.

Application November 15, 1952, Serial No. 320,644

1 Claim. (Cl. 137—625.37)

This invention relates to slide valves wherein it is necessary to have relative motion between a port and a seal installation, as for example where a port or discontinuity in the surface of either the valve housing or the slide valve therein must pass over or under a seal located in the other member. While primarily relating to O rings, as currently in wide use for high pressure hydraulic systems, it is equally applicable to installations using other types of elastic and/or flexible packings or seals, to prevent damage to the latter while shifting the valve.

It has heretofore been a major problem in connection with sliding or reciprocating valves, as used in high pressure hydraulic systems, to properly seal off a fluid port in one of the relatively movable parts. Even with the most accurately lapped surfaces some leakage occurs at operating pressures. Attempts at using a resilient packing or seal such as an O ring between the relatively movable surfaces have resulted in pinching or cutting the packing, which must be installed with some compression which is augmented if any pressure differential acts on the seal material, the net result being that the seal material tends to expand or extrude into any clearances, such as discontinuities or ports which pass the seal during the valve operation. The groove in which the seal is positioned must have sharp edges to prevent extrusion of the seal under pressure, and when the seal expands into a discontinuity on the other part of the valve the sharp edges of the seal groove will nick or cut the expanded seal when the seal approaches its sealing position at the other extreme of the valve travel. It is accordingly an object of this invention to prevent expansion of the seal material during the operation of such a valve.

It is also an object of this invention to release any unbalanced fluid pressure on the seal during relative motion of the valve member to relieve the seal of the distorting and extruding effect of such fluid pressure during the relative movement of the valve parts.

It is a further object of this invention to provide a sliding valve arrangement wherein fluid is bypassed a seal ring during the operation of the valve from one position to another without permitting extrusion or expansion of the seal ring into the bypass passage.

It is another object of this invention to provide an improved and simplified transfer valve wherein O rings serve to seal the several fluid connections from each other.

Other and further object of my invention will become apparent as the detailed descriptions of two embodiments of my invention illustrated in the accompanying drawings proceed. As shown in the drawings:

Figure 1 illustrates a longitudinal section of a transfer valve wherein fluid can be selected from either of two sources for delivery to a desired connection, the transfer valve embodying a preferred version of my invention illustrating the use of O rings.

Figure 2 is a section on the line 2—2 of Figure 1 showing the grooves or splines in the piston.

Figure 3 is a section similar to Figure 1 showing the valve piston shifted to select the other source of fluid.

Figure 4 illustrates the use of the seal bypass of my invention in connection with an O ring seal on the piston for use in hydraulic brake master cylinders for example.

Figure 5 is a section on the line 5—5 of Figure 4 to show the cylinder port and grooves in cross section.

The embodiment of my invention shown in Figures 1 to 3 illustrates a transfer valve to be used to select alternative sources of pressure fluid for connection to an operating circuit. The operating circuit may have a critical function to perform, so that the normal supply of pressure fluid is backed up by an emergency supply source of pressure fluid which can be substituted in the operating circuit upon failure of the normal supply of fluid. As illustrated, the connection A would lead to the operating circuit, and the connections B and C from the alternative sources of fluid supply. As shown in Figure 1 connection B is supplying connection A. In Figure 3 the flow is from C to A. The flow could of course be in the opposite direction, as for a return connection from the operating circuit, or if A were for a return line to the alternative supply sources.

The transfer valve so identified is shown in simplified form as having a valve body 10 with a cylindrical bore 11, and a valve piston 12 sliding therein. The connections A, B and C previously referred to lead to spaced port grooves 13, 14 and 15 in the bore 11 of the valve body, and outside and between the port grooves, other grooves 16 in the bore 11 contain O rings 17 and 18 of rubber-like material which are slightly compressed diametrically between the bottom of their grooves and the surface of the piston. It is believed that the theory and practice regarding O rings is now so well known that further details thereof are unnecessary except in connection with axial movement of the O rings over a piston discontinuity or vice versa, as will be discussed hereinafter.

The outside O rings 17 serve as conventional seals against the unbroken surface of the piston 12, but the O rings 18 between the port grooves 13 and 14, and 14 and 15, are required to alternately seal between the piston and cylinder and pass a substantial flow of hydraulic fluid under high pressure. In order to provide passages for fluid flow from port groove 13 to port groove 14 as in Figure 1 a series of narrow slots 19 are cut into the piston. In form and appearance these slots resemble spline grooves or keyways cut into a shaft, the lands 20 between grooves forming bridges or continuations of the valve piston surface, while both ends of each groove merge into the piston surface by ramps 21 without sharp edges, and the sides of the lands have their corners slightly rounded to prevent cutting the O rings. The lands 20 formed by the grooves or slots 19 support the O ring on its inner diameter as installed and are close enough together to eliminate inward bulging of the rings into the slots between the lands. The slots 19 serve as fluid ducts beneath the O rings 18 for the desired flow of fluid, and also relieve the O rings of any differential pressure that would tend to extrude or distort the O rings. To so relieve the O rings of differential pressure the slots 21 must have a length slightly greater than the distance between the O rings 18, in order to dissipate the pressure differential across the O rings as the valve piston 12 moves from one position to another.

The version of my invention shown in Figures 4 and 5 is intended to illustrate the application of my invention to O rings 28 carried by a piston 25 reciprocating in a cylindrical bore 26. The particular showning is intended to represent the master cylinder of a hydraulic brake system, wherein the return or release stroke of the piston 25 uncovers a make up port 27. As heretofore used the make-up port was merely a drilled hole the sharp edges of which tended to nibble the lip of the usual rubber piston on the power or brake application movement of the piston to the left. My invention is applied to a make-up port 27 by forming a narrow circular groove 29 in the wall of the bore 26, the groove 29 having end ramps 30 leading from the groove to the surface of the bore 26 to prevent cutting of an O ring 28 installed on the piston 25. The groove 29 thus forms a reservoir feeding fluid over the O ring through the ramps 30. This version is also intended to show that the packing may be carried on the piston past ports in the wall of the bore.

The operation of the two embodiments of this invention is believed to be readily apparent to those skilled in the art. In that of Figures 1 to 3, Figure 1 shows fluid flow from connection B to connection A or vice versa, and shifting the piston 12 to the right, into the position of Figure 3 shuts off connection B and transfers the flow to between connections C and A. The slots 20 in the piston 12 provide for free flow of fluid past the O ring 18 interposed between the ports 13 and 14 or 14 and 15 as the case may be. The O ring 18 so bypassed is supported on the tops of the lands 21 and therefore does not expand into the slots, and the slots balance the working pressure acting on both sides of the O ring 18 under which the slotted area of the piston is moving, thus preventing differential pressures from distorting or extruding the O ring 18 while supported on the lands 21. It is important that the slots have a slightly greater length than the distance between the O rings 18 which are alternately bypassed by the slot, so that during the movement of the spool differential pressures will not be built up on the O rings until a solid surface of the piston 12 is on position beneath the O rings.

In the second version of this invention, the ramps 30 leading from groove 29 at the port 27 will prevent the development of fluid pressure until the O ring 28 reaches the unbroken surface of the bore 26.

It will thus be seen that I have invented an improved and simplified valve wherein a resilient seal is subjected to relative movement between sliding members, and fluid at high pressure can be bypassed across or over or under the seal without damage to the seal due to extrusion or expansion thereof into such bypass passages during the relative movements of the valve parts.

I claim:

A reciprocating valve comprising a body having an uniform diameter bore therein with three spaced annular communicating grooves in said bore, three ports in said body in series each communicating with one of said annular grooves, said intermediate port serving to connect either of said end ports, annular sealing ring grooves in said bore located between said communicating grooves, O rings in said sealing ring grooves to seal between said spaced communicating grooves, said annular communicating grooves and said annular sealing ring grooves being equispaced and uniform in cross section, a valve piston reciprocable in said bore from a position in which it connects said intermediate port with one end port to a position in which it connects said intermediate port with the other end port, said piston having an uniform diameter only slightly less than the diameter of said bore for providing a tight fit in said bore, said piston having a series of in-line, equi-length, parallel, uniform width, narrow, longitudinal slots uniformly spaced in a circumferential manner about said piston, said series of slots being in number more than four, said slots in said piston defining intervening lands on which said O rings are supported during reciprocation of said piston, said lands being in width at least that of said slots, said lands having rounded edges, said slots having ramps at either end, said slots being in length equal to the distance between the front wall of one groove and the rear wall of the third groove spaced therefrom, said slots being in length slightly greater than the distance between the O rings, whereby differential pressure in the O rings is relieved and the pressure differential dissipated across said O rings as said piston reciprocates from the one position to the other position.

References Cited in the file of this patent
UNITED STATES PATENTS

| | | |
|---|---|---|
| 2,001,941 | Rowe | May 21, 1935 |
| 2,190,575 | Tabb | Feb. 13, 1940 |
| 2,485,504 | Morgan | Oct. 18, 1949 |
| 2,517,061 | Von Stackelberg | Aug. 1, 1950 |

FOREIGN PATENTS

| | | |
|---|---|---|
| 194,830 | Great Britain | 1921 |
| 662,448 | Great Britain | 1951 |